United States Patent
Iris et al.

(10) Patent No.: US 6,888,539 B2
(45) Date of Patent: May 3, 2005

(54) BUSINESS METHODS AND HARDWARE TO IMPLEMENT SAME

(75) Inventors: Jeffrey A. Iris, Avon, CT (US); Ronald T. Jerdonek, West Hartford, CT (US); Carol Ann Cummiskey, Wethersfield, CT (US)

(73) Assignee: General Electric Company, Schenectady, NY (US)

( * ) Notice: Subject to any disclaimer, the term of this patent is extended or adjusted under 35 U.S.C. 154(b) by 214 days.

(21) Appl. No.: 10/228,810

(22) Filed: Aug. 27, 2002

(65) Prior Publication Data

US 2004/0054756 A1 Mar. 18, 2004

(51) Int. Cl.[7] .............................. G06T 15/00
(52) U.S. Cl. .................. 345/418; 709/231; 709/232
(58) Field of Search .................. 345/418, 419, 345/619, 625; 709/231–237; 707/104.1

(56) References Cited

U.S. PATENT DOCUMENTS

| 6,230,205 | B1 | | 5/2001 | Garrity et al. ............... 709/231 |
| 6,233,682 | B1 | | 5/2001 | Fritsch ........................ 713/168 |
| 6,456,297 | B1 | * | 9/2002 | Wilensky ..................... 345/619 |
| 6,477,435 | B1 | * | 11/2002 | Ryan et al. .................... 700/86 |

* cited by examiner

Primary Examiner—Phu K. Nguyen
(74) Attorney, Agent, or Firm—Armstrong Teasdale LLP

(57) ABSTRACT

A method for facilitating transfer of Human Machine Interface (HMI) files. The method includes uploading at least one HMI file via a network to a server and converting the at least one HMI file into an image file.

22 Claims, 8 Drawing Sheets

US 6,888,539 B2

BUSINESS METHODS AND HARDWARE TO IMPLEMENT SAME

BACKGROUND OF THE INVENTION

This invention relates generally to networked environments and, more particularly, to facilitating file exchange across networks.

The use of programmable logic controllers (PLCs) has increased dramatically as technological advances have lowered component costs and increased computational power. Accordingly, less experienced people are being exposed to PLCs in increasing numbers and human machine interfaces (HMIs) have been developed to aid the less experienced users in programming the PLCs (and other programmable equipment) and to aid all users in taking advantage of the increased computational power and control capabilities that newer PLCs offer. Typically, the PLCs are programmed and monitored using a computer running an HMI.

At least some known HMIs employ HMI screens and objects. An object is a graphical element relating to a piece of equipment or a process. The object can be an input object allowing a user to input data or the object can be an output object and provides the user with data. Additionally an object can both allow input and provide feedback (output) about the equipment or process. The object is typically configurable regarding shape, size, color, fill, visibility, and animation. A screen is a form including at least one object.

Because similar equipment and processes are employed at different facilities, programmers will sometimes create a page or an object that another programmer has already created. This duplication of effort by different programmers at different locations is wasteful.

BRIEF DESCRIPTION OF THE INVENTION

In one aspect, a method is provided for facilitating transfer of Human Machine Interface (HMI) files. The method includes uploading at least one HMI file via a network to a server and converting the at least one HMI file into an image file.

In another aspect, a network-based system is provided for facilitating transfer of Human Machine Interface (HMI) files. The network-based system includes at least one server comprising a memory, and at least one client system connected to the server through a network. The server is configured to upload at least one HMI file via the network to the server, and convert the at least one HMI file into an image file.

DETAILED DESCRIPTION OF THE INVENTION

Set forth below are descriptions of embodiments of methods and systems for network-based screen and object exchange. The methods and systems facilitate transfer of Human Machine Interface (HMI) files.

The methods and systems are not limited to the specific embodiments described herein. In addition, components of each system and each method may be practiced independent and separate from other components and methods described herein. Each component and method can also be used in combination with other components and methods.

Figure 1:
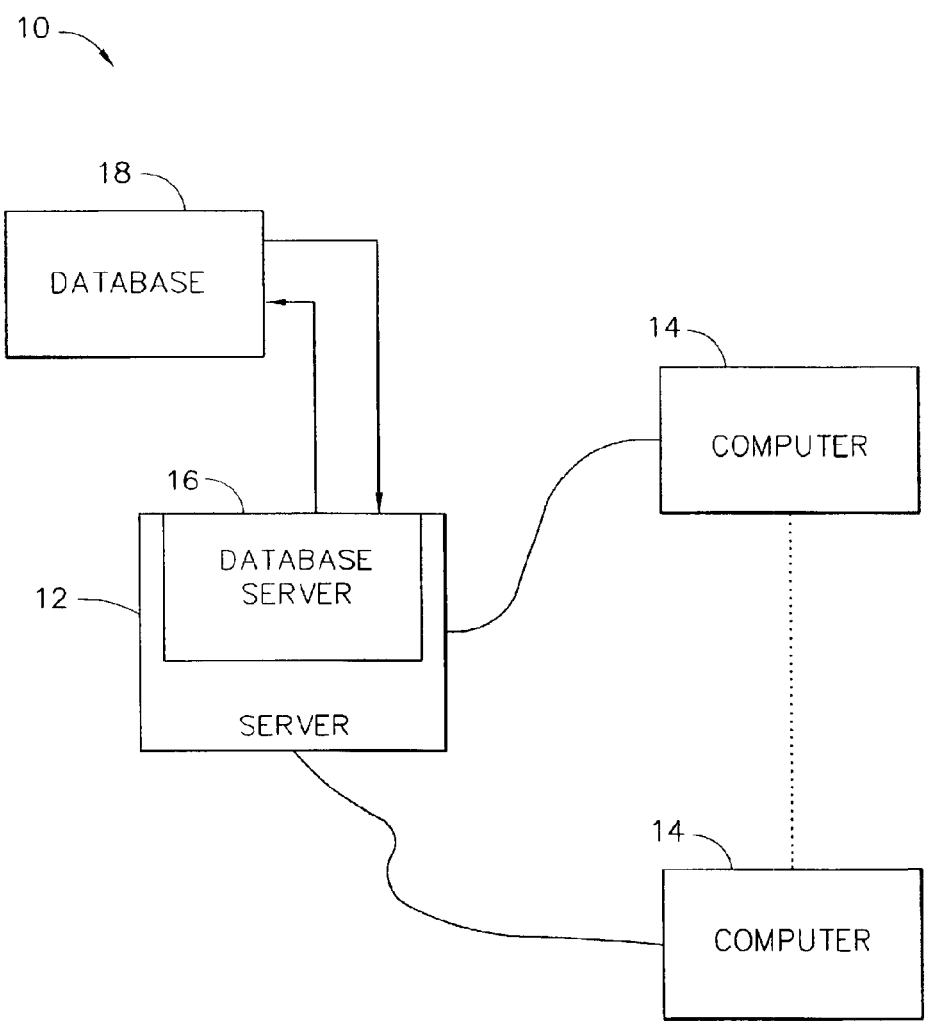
FIG. 1 is a simplified block diagram illustrating one embodiment of a screen and object exchange system for facilitating transfer of Human Machine Interface (HMI) files.
Figure 2:
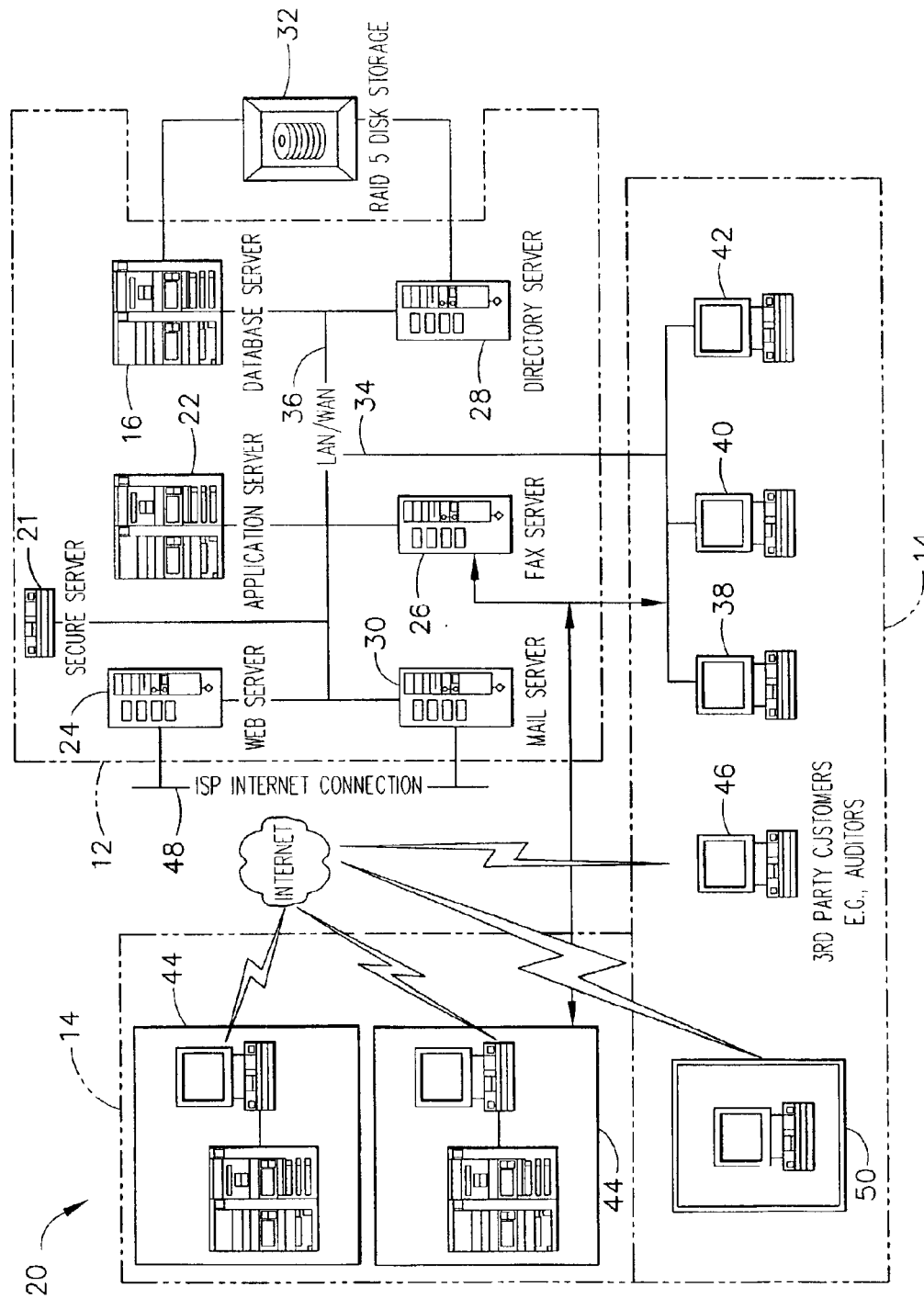
FIG. 2 is an expanded version block diagram of one embodiment of server architecture of a screen and object exchange system.

FIGS. 1 and 2 illustrate, in block diagram form, hardware architectures that can be utilized in connection with a screen and object exchange system. Of course, the system can be implemented on many different platforms and utilizing different architectures. The architectures illustrated in FIGS. 1 and 2, therefore, are examples only.

FIG. 1 is a simplified block diagram of one embodiment of a screen and object exchange system 10 for facilitating transfer of HMI files. System 10 includes a server sub-system 12 and a plurality of client systems 14 connected to server sub-system 12. Client systems 14 are configured to communicate electronically with server sub-system 12. Server sub-system 12 is accessible to client systems 14 via a first network, such as a local area network (LAN), a wide area network (WAN), or the Internet. In one embodiment, client systems 14 are computers including a web browser, and server sub-system 12 is accessible to client systems 14 via the Internet. In an alternative embodiment, client systems 14 are servers for a network of customer devices. Client systems 14 are interconnected to the first network through many interfaces including a second network, such as a LAN, a WAN, or the Internet, dial-in-connections, cable modems and special high-speed ISDN lines. Client systems 14 could be any device capable of interconnecting to the first network and/or the second network, including a web-based phone or other web-based connectable equipment. Server sub-system 12 includes a database server 16 that is connected to a centralized database 18. In one embodiment, centralized database 18 is stored on database server 16. Alternatively, in another embodiment, centralized database 18 is stored remotely from server sub-system 12.

The term 'user', as used herein, may refer to any employee of the business entity that is authorized by the business entity to access server sub-system 12, or any third party authorized by the business entity to access server sub-system 12. Users access server sub-system 12 at client system 14 by logging onto server sub-system 12 through client system 14. In one embodiment, database 18 contains user names, user passwords, and user profiles. Further, and in one embodiment, users must enter a valid user name and a valid user password to access server sub-system 12. A user's access to, and ability to perform, some or all of the below described methods and other actions may be restricted or prohibited according to a user's user name, password, and/or profile. For example, and in one embodiment, certain of the below methods and other actions may only be performed by managers within the business entity.

In one embodiment, server sub-system 12 is coupled to client systems 14 via a WAN, a LAN, or the Internet. A user may dial or directly log on to a WAN, a LAN, or the Internet to gain access. Each client system 14 includes an interface for communicating with server sub-system 12. The interface allows a user to input data and to receive data relating to the request. A computer-based tool for project management, as described below in more detail, is stored in server sub-system 12 and can be accessed by a user at sever system 12 or any of client systems 14.

FIG. 2 is an expanded version block diagram of one embodiment of server architecture of a screen and object exchange system 20. Components in system 20 identical to components of system 10 (shown in FIG. 1) are identified in FIG. 2 using the same reference numerals used in FIG. 1. System 20 is configured to facilitate transfer of HMI files. System 20 includes server sub-system 12 and a plurality of client systems 14. Server sub-system 12 includes a database server 16, a secure server 21, an application server 22, a web server, or main server, 24, a fax server 26, a directory server 28, and a mail server 30. A disk storage unit 32 incorporating a computer-readable medium is coupled to database server 16 and directory server 28. Servers 16, 21, 22, 24, 26, 28, and 30 are coupled in a LAN 34. In an alternative embodiment, servers 16, 21 22, 24, 26, 28, and 30 are coupled in a WAN 36.

Client systems 14 include a system administrator workstation 38, a user workstation 40, and a supervisor workstation 42. Workstations 38, 40, and 42 are coupled to LAN 34. In an alternative embodiment, workstations 38, 40, and 42 are coupled to WAN 36. Further, in another embodiment, workstations 38, 40, and 42 are coupled to LAN 34 or WAN 36 via an Internet link or through an intranet. Each workstation 38, 40, and 42 is a personal computer having a web browser. Although the functions performed at the workstations typically are illustrated as being performed at respective workstations 38, 40, and 42, such functions can be performed at one of many personal computers coupled to LAN 34 or WAN 36. Workstations 38, 40, and 42 are illustrated as being associated with separate functions only to facilitate an understanding of the different types of functions that can be performed by individuals having access to LAN 34 or WAN 36.

In one embodiment, client systems 14 include at least one employee or individual workstation 44 and/or at least one third party user workstation 46. In one embodiment, at least one of workstations 44 and 46 are remotely located from server sub-system 12, and server sub-system 12 is configured to be communicatively coupled to workstations 44 and/or 46 via an ISP Internet connection 48. Although the communication between server sub-system 12 and workstations 44 and/or 46 is illustrated as being performed via the Internet, it will be understood that any other WAN or LAN type communication can be utilized in other embodiments, i.e., the systems and processes are not limited to being practiced via the Internet. For example, server sub-system 12 may communicate with workstations 44 and/or 46 using LAN 34, WAN 36, or a combination of LAN 34 and WAN 36.

In one embodiment, any user having a client system 14 can access server sub-system 12. Further client systems 14 include at least one workstation 50 located at a remote location, and server sub-system 12 is communicatively coupled to workstation 50 via an ISP Internet connection, for example ISP Internet connection 48, or a WAN, for example WAN 36. Workstations 44, 46, and 50 are personal computers having a web browser. Also, workstations 44, 46, and 50 are configured to communicate with server sub-system 12. In one embodiment, and wherein workstations 44, 46, and 50 are remotely located from server sub-system 12, fax server 26 communicates with workstations 44, 46, and 50 via a telephone link. Furthermore, in another embodiment, fax server 26 is configured to communicate with workstations 38, 40, and 42.

Figure 3:
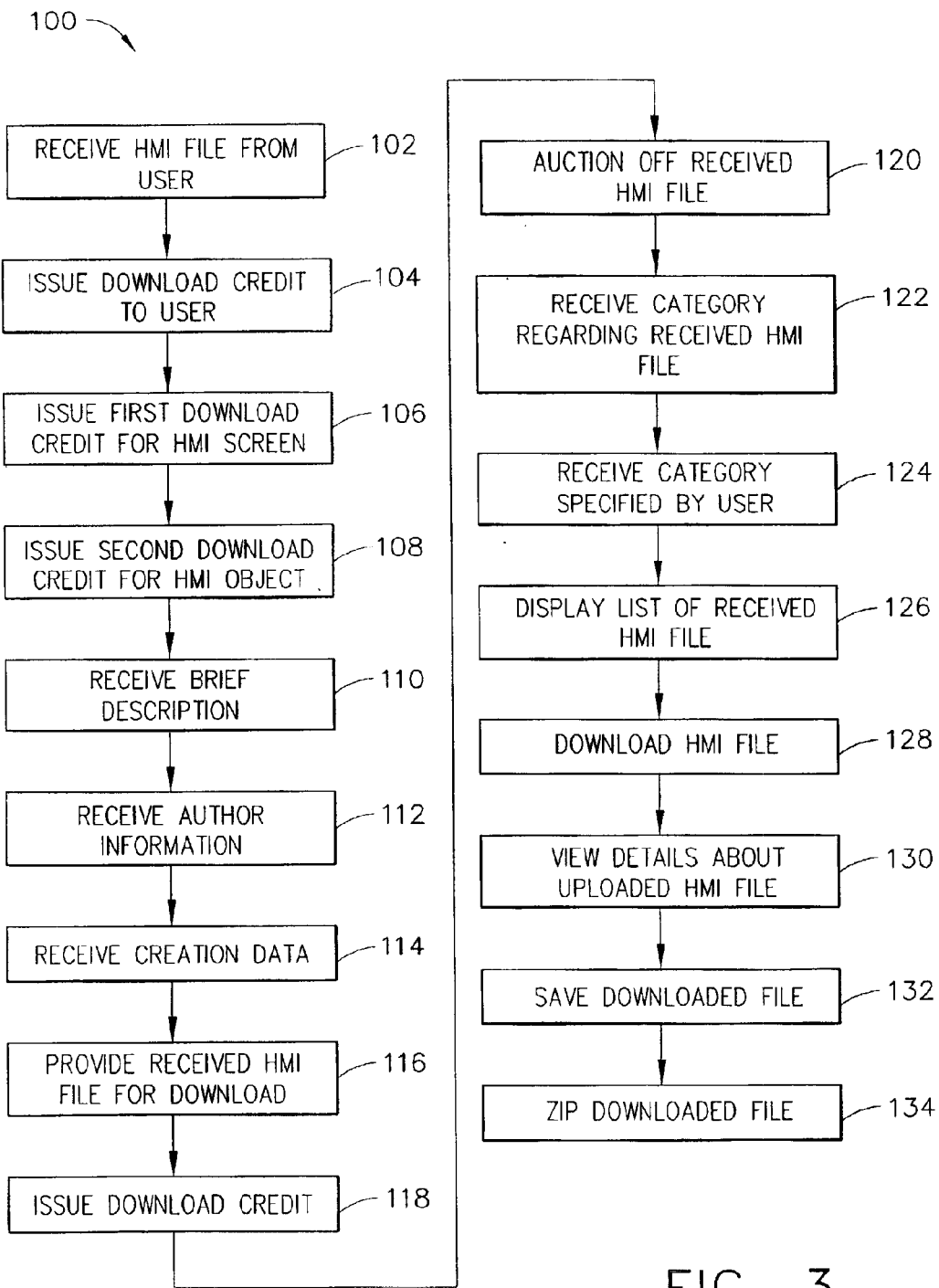
FIG. 3 is a flowchart illustrating one embodiment of a method for facilitating transfer of HMI files using the screen and object exchange system shown in FIG. 2.

FIG. 3 is a flow chart illustrating an exemplary embodiment of a method 100 for facilitating transfer of HMI files using screen and object exchange system 20. System 20 (shown in FIG. 2) receives 102 at least one HMI file from a user using a client system 14 (shown in FIG. 2) via LAN 34 (shown in FIG. 2), WAN 36 (shown in FIG. 2), or the ISP Internet connection 48 (shown in FIG. 2). In one embodiment, the at least one HMI file includes at least one of an HMI screen and an HMI object. System 20 then issues 104 a download credit to the user for the received HMI file. System 20 issues 106 a first download credit when the received HMI file is an HMI screen and issues 108 a second download credit when the received HMI file is an HMI object. In one embodiment, the second download credit is greater than the first download credit. Furthermore, and in one embodiment, system 20 calculates a code complexity, including regression testing the received HMI file on an array of computers (not shown), for the received HMI file and issues the download credit based upon the code complexity. System 20 also receives 110 a brief description of the received HMI file, receives 112 author information regarding the received HMI file, and/or receives 114 a creation date of the received HMI file from the user via LAN 34, WAN 36, or ISP Internet connection 48.

In one embodiment, system 20 provides 116 the received HMI file for download by other users using LAN 34, WAN 36, or ISP Internet connection 48. System 20 issues 118 a download credit to the user when another user downloads the received HMI file. Method 100 further includes auctioning 120 the received HMI file, wherein the download credit issued to the user is based upon the auction price, using system 20 and LAN 34, WAN 36, or ISP Internet connection 48. In one embodiment, system 20 receives 122 a category regarding the received HMI file from the user via LAN 34, WAN 36, or ISP Internet connection 48. In addition, and in one embodiment, system 20 receives 124 a category specified by a user desiring to download at least one HMI file and displays 126 a list of received HMI files on client system 14 that are available for download and are within the specified category. A user may then select from the list to download 128 an HMI file from server subsystem 12 using client system 14, and LAN 34, WAN 36, or ISP Internet connection 48. In one embodiment, when a user selects to download 128 an uploaded HMI file, the user can view 130 details about the uploaded HMI file, for example a brief description of the uploaded HMI file, author information regarding the uploaded HMI file, a category regarding the uploaded HMI file, and/or a creation date of the uploaded HMI file. Once a file is downloaded 128, system 20 prompts the user to save 132 the downloaded HMI file to a specified location within server subsystem 12 or otherwise. In one embodiment, the downloaded HMI file is zipped 134 when saved 132.

Figure 4:
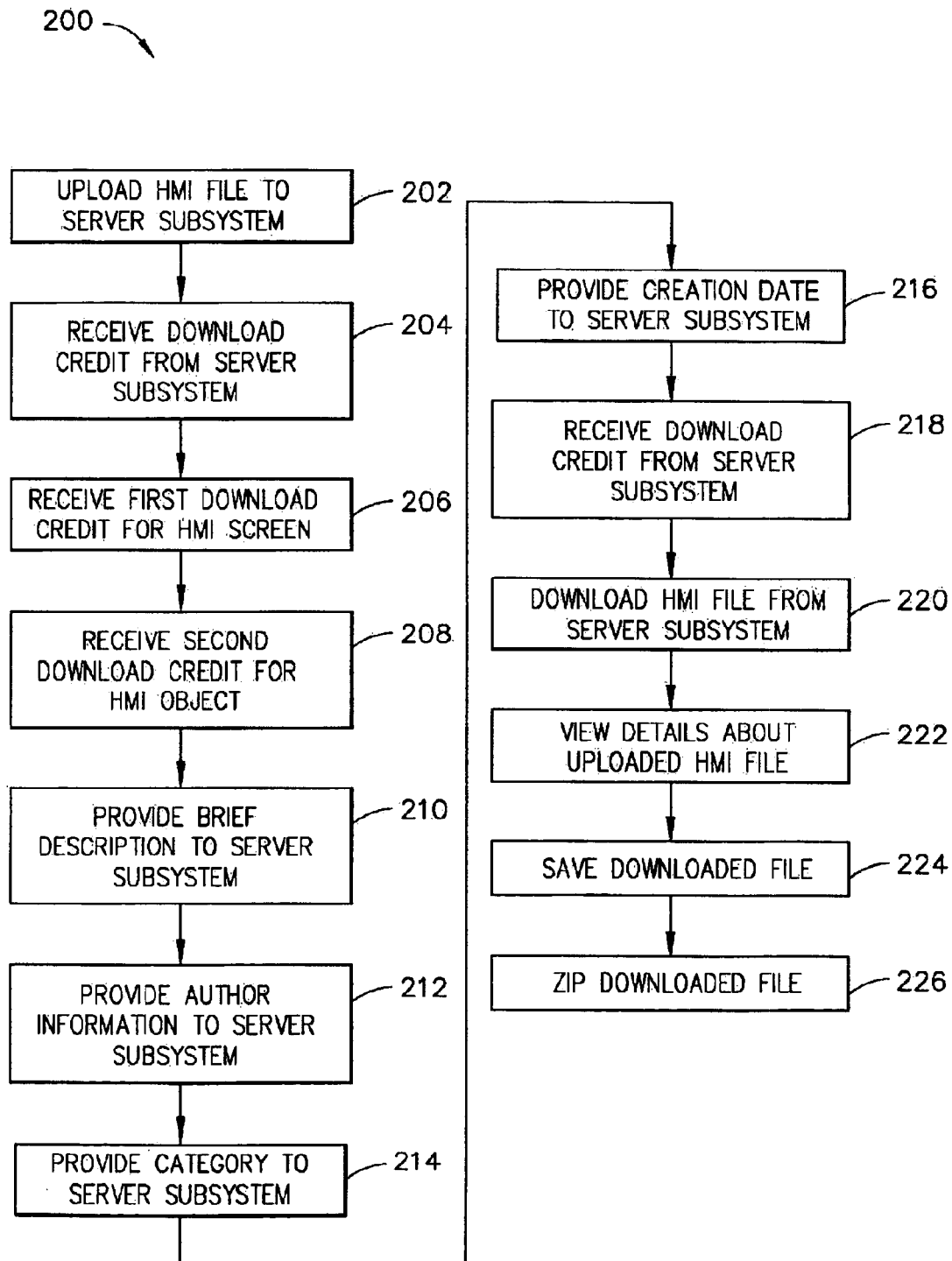
FIG. 4 is a flowchart illustrating one embodiment of a method for facilitating transfer of HMI files using the screen and object exchange system shown in FIG. 2.

FIG. 4 is a flow chart illustrating an exemplary embodiment of a method 200 for facilitating transfer of HMI files using screen and object exchange system 20. Using a client system 14 (shown in FIG. 2) and system 20 (shown in FIG.

2), a user uploads 202 at least one HMI file via a LAN 34 (shown in FIG. 2), WAN 36 (shown in FIG. 2), or ISP Internet connection 48 (shown in FIG. 2) to server subsystem 12 (shown in FIG. 2). In one embodiment, the at least one HMI file includes at least one of an HMI screen and an HMI object. The user then receives 204 a download credit from server subsystem 12 for the uploaded HMI file, wherein the user receives 206 a first download credit from server subsystem 12 when the uploaded HMI file is an HMI screen, and receives 208 a second download credit from server subsystem 12 when the received HMI file is an HMI object. In one embodiment, the second download credit is greater than the first download credit.

Further, and in one embodiment, the user receives a download credit based upon a code complexity and/or an auction price for the uploaded HMI file. The user then provides 210 a brief description of the uploaded HMI file, provides 212 author information regarding the uploaded HMI file, provides 214 a category regarding the uploaded HMI file, and/or provides 216 a creation date of the uploaded HMI file to server subsystem 12 using LAN 34, WAN 36, or ISP Internet connection 48. When another user downloads the uploaded HMI file, the user receives 218 from server subsystem 12 a download credit. A user may download 220 an HMI file from server subsystem 12 using client system 14 and at least some of the user's download credit with system 20, as well as and LAN 34, WAN 36, or ISP Internet connection 48. In one embodiment, when a user selects to download an uploaded HMI file, the user can view 222 details about the uploaded HMI file, for example a brief description of the uploaded HMI file, author information regarding the uploaded HMI file, a category regarding the uploaded HMI file, and/or a creation date of the uploaded HMI. Once a file is downloaded, system 20 prompts the user to save 224 the downloaded HMI file to a specified location within server subsystem 12 or otherwise. In one embodiment, the downloaded HMI file is zipped 226 when saved 224.

Figure 5:
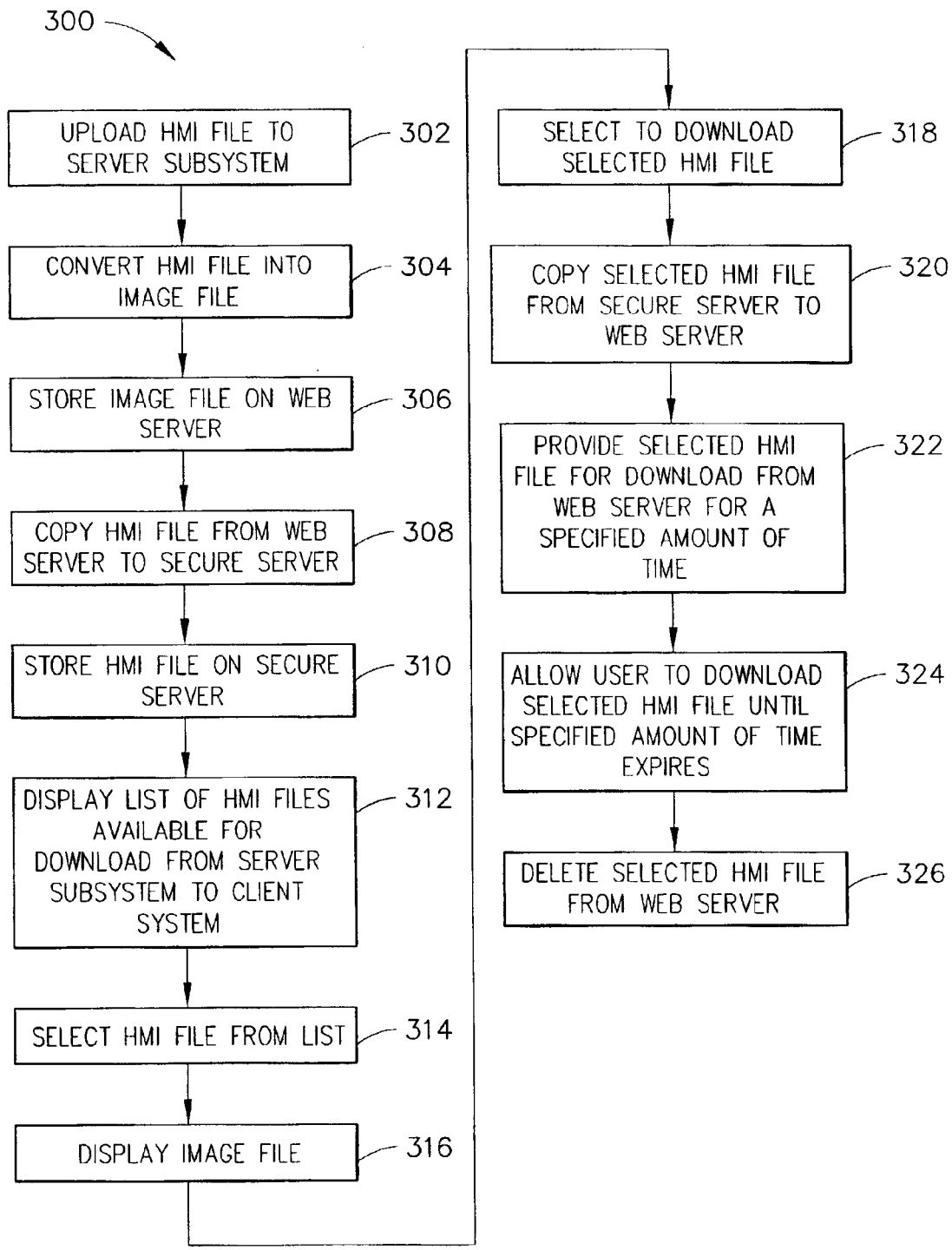
FIG. 5 is a flowchart illustrating one embodiment of a method for facilitating transfer of HMI files using the screen and object exchange system shown in FIG. 2.

FIG. 5 is a flow chart illustrating an exemplary embodiment of a method 300 for facilitating transfer of HMI files using screen and object exchange system 20 (shown in FIG. 2). Method 300 facilitates secure transfer of HMI files. Method 300 includes uploading 302 at least one HMI file to server subsystem 12, converting 304 the at least one HMI file into an image file, and storing 306 the image file on web server 24 (shown in FIG. 2). Web server 24 then copies 308 the at least one HMI file from web server 24 to secure server 21 (shown in FIG. 2) and stores 310 the at least one HMI file on secure server 21. Without converting 304 the at least one HMI file into an image file, a potential user would have no way to view the HMI screen without possessing the code.

In one embodiment, server subsystem 12 displays 312 on client system 14 (shown in FIG. 2) a list of HMI files available for download from server subsystem 12 to client system 14. When a user selects 314 an HMI file from the list, server subsystem 12 displays 316 on client system 14 an image file that is stored on web server 24 and represents the selected HMI file. After viewing the image file, a user selects 318 to download the selected HMI file. Server subsystem 12 then copies 320 the selected HMI file from secure server 21 to web server 24 and provides 322 the HMI file for download from web server 24 for a specified amount of time. In one embodiment, and for example, the specified amount of time is fifteen minutes. Web server 24 allows 324 the user to download the HMI file from web server 24 to client system 14 until the specified amount of time expires. Upon expiration of the specified amount of time, web server 24 deletes 326 the selected HMI file from web server 24 and the selected file is no longer available for download from web server 24 to client system 14.

Figure 6:
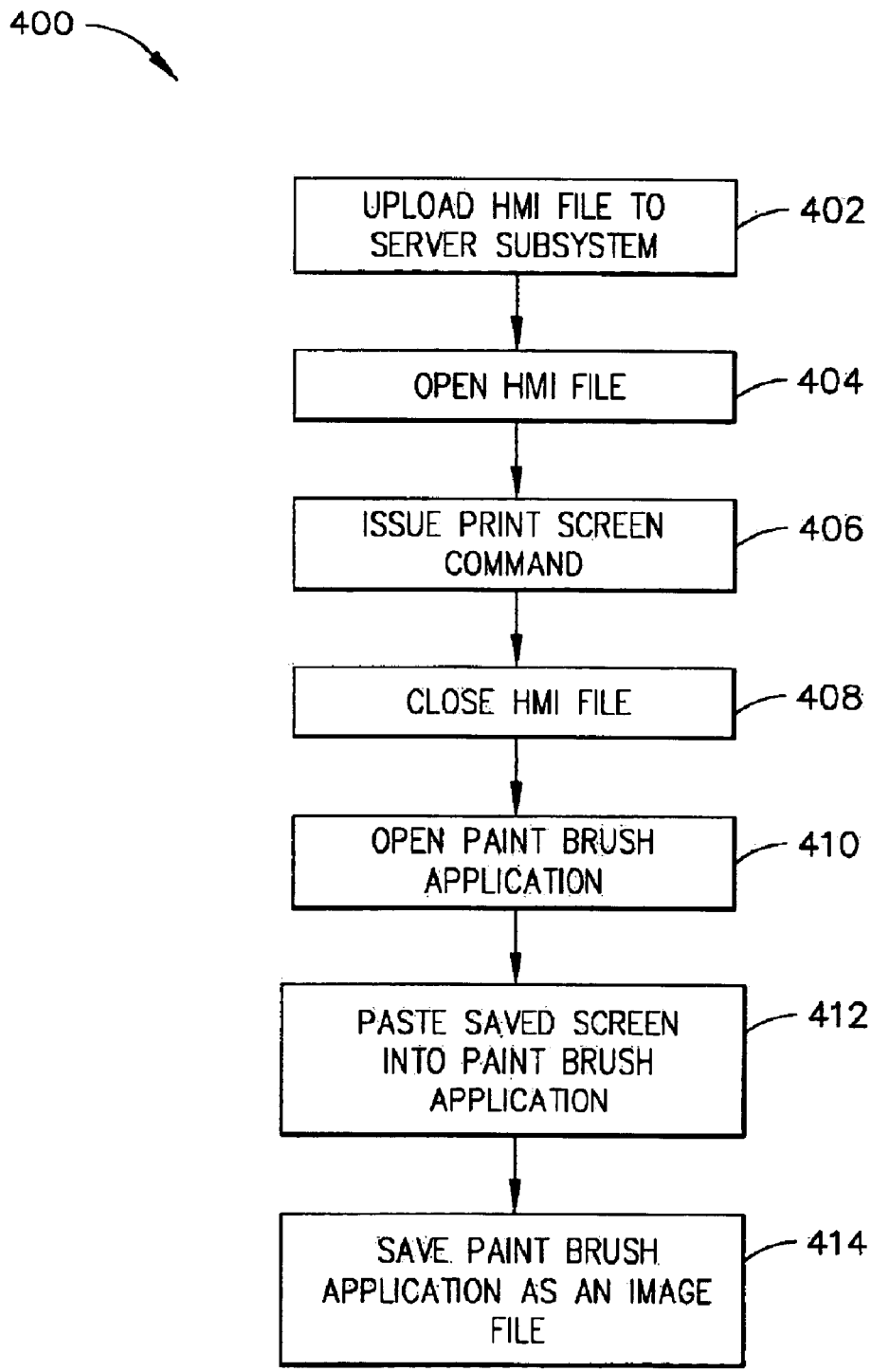
FIG. 6 is a flowchart illustrating one embodiment of a method for facilitating transfer of HMI files using the screen and object exchange system shown in FIG. 2.

FIG. 6 is a flow chart illustrating an exemplary embodiment of a method 400 for facilitating transfer of HMI files using screen and object exchange system 20 (shown in FIG. 2). Method 400 facilitates converting HMI files into image files, as described above. Method 400 includes uploading 402 at least one HMI file to server subsystem 12 and opening 404 the at least one HMI file when uploading is complete. In one embodiment, method 400 includes a delay to ensure that the at least one HMI file is completely open. For example, and in one embodiment, method 400 includes a two second delay. Once the at least one HMI file is open, server subsystem 12 issues 406 a print screen command to save the screen of the at least one open HMI file into a memory (not shown) within server subsystem 12, and thereafter closes 408 the at least one HMI file. Server subsystem 12 then opens 410 a paint brush application stored within server subsystem 12 and pastes 412 the saved screen of the HMI file from the memory into the paint brush application. Sever subsystem 12 saves 414 the paint brush application, including the saved screen of the at least one HMI file, to server subsystem 12 as an image file. In one embodiment, server subsystem 12 saves 414 the paint brush application, including the saved screen of the at least one HMI file, as a bitmap image file. In another embodiment, server subsystem 12 saves 414 the paint brush application, including the saved screen of the at least one HMI file, as a jpeg image file. In yet another embodiment, server subsystem 12 saves 414 the paint brush application, including the saved screen of the at least one HMI file, as a bitmap image file and converts the bitmap image file into a jpeg image file.

Figure 7:
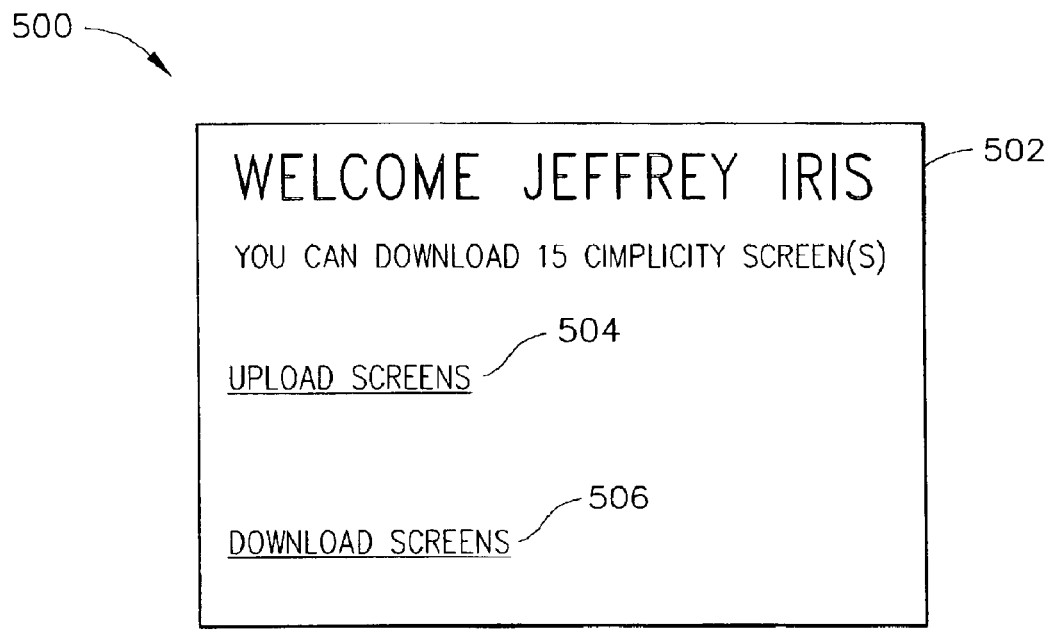
FIG. 7 is an example of a login interface for one embodiment of a screen and object exchange system.

FIG. 7 is a login interface 500 for screen and object exchange system 20 (shown in FIG. 2). Users are identified with a login name 502. Information associated with login name 502 is stored in server subsystem 12. Interface 500 includes a button 504 for uploading HMI files and a button 506 for downloading HMI files. If a user selects button 504 to upload an HMI file, the user is prompted for information on the HMI file chosen to upload. The description and map address of the HMI file are required for upload.

Figure 8:
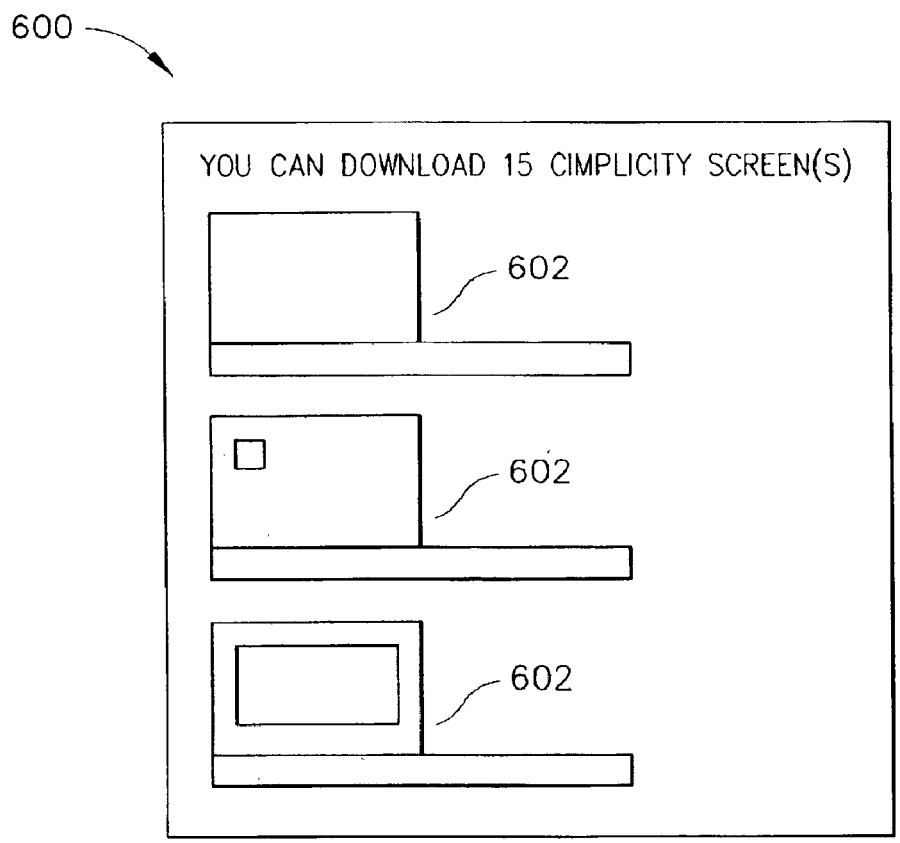
FIG. 8 is an example of a download interface for one embodiment of a screen and object exchange system.

FIG. 8 is a download interface 600 for screen and object exchange system 20 (shown in FIG. 2). Download interface 600 includes a plurality uploaded HMI files 602 that are available for download from system 20 using client system 14 (shown in FIG. 2).

Figure 9:
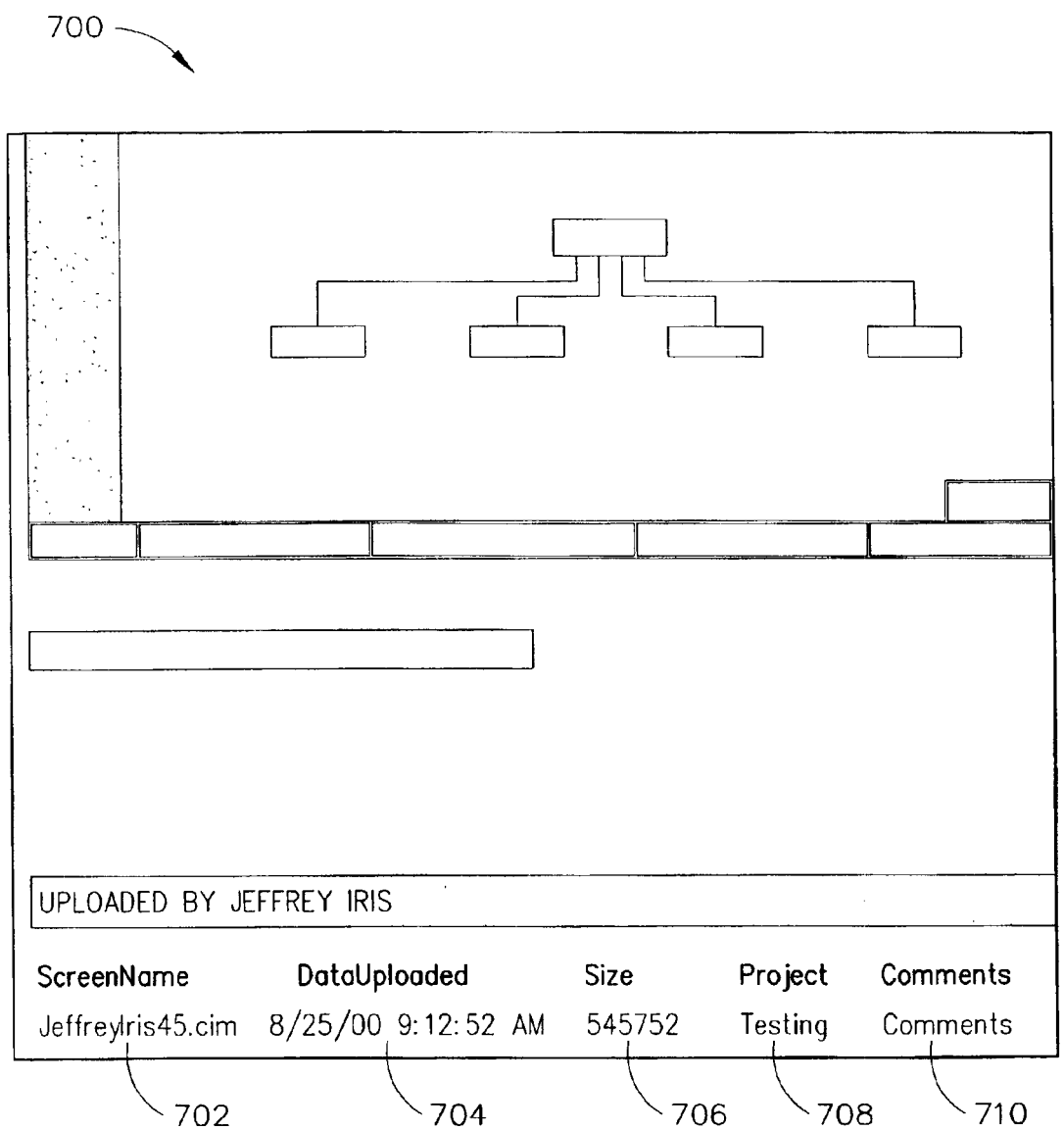
FIG. 9 is an example of a view details interface for one embodiment of a screen and object exchange system.

FIG. 9 is a view details interface 700 for screen and object exchange system 20 (shown in FIG. 2). Interface 700 includes details about a particular HMI file available for download, such as author information 702 regarding the HMI file, a creation date 704 of the HMI file, a file size 706 for the HMI file, a project name 708 for the HMI file, and comments 710 regarding the HMI file. Interface 700 may also include, for example, a brief description of the uploaded HMI file and a category regarding the HMI file.

While the invention has been described in terms of various specific embodiments, those skilled in the art will recognize that the invention can be practiced with modification within the spirit and scope of the claims.

What is claimed is:

1. A method for facilitating transfer of Human Machine Interface (HMI) files, said method comprising:

uploading at least one HMI file via a network to a server;

converting the at least one HMI file into an image file; and issuing an amount of credit to a user based on at least one of code complexity of the at least one HMI file and an auction price of the at least one HMI file.

2. A method in accordance with claim 1 wherein said uploading at least one HMI file via a network comprises uploading at least one HMI file comprising at least one of a HMI screen and a HMI object.

3. A method in accordance with claim 1 wherein uploading at least one HMI file via a network to a server comprises opening the at least one HMI file when uploading is complete.

4. A method in accordance with claim 3 wherein converting the at least one HMI file into an image file comprises issuing a print screen command to save the screen of the open HMI file into a memory within the server.

5. A method in accordance with claim 4 wherein converting the at least one HMI file into an image file further comprises closing the at least one HMI file after issuing the print screen command.

6. A method in accordance with claim 4 wherein converting the at least one HMI file into an image file further comprises opening a paint brush application.

7. A method in accordance with claim 6 wherein converting the at least one HMI file into an image file further comprises:
   pasting the saved screen of the HMI file into the paint brush application; and
   saving the paint brush application, including the saved screen of the HMI file, as an image file.

8. A method in accordance with claim 7 wherein saving the paint brush application comprises saving the paint brush application, including the saved screen of the HMI file, to the server.

9. A method in accordance with claim 7 wherein saving the paint brush application, including the saved screen of the HMI file, as an image file comprises saving the paint brush application, including the saved screen of the HMI file, as a bitmap image file.

10. A method in accordance with claim 7 wherein saving the paint brush application, including the saved screen of the HMI file, as an image file comprises saving the paint brush application, including the saved screen of the HMI file, as a jpeg image file.

11. A method in accordance with claim 1 wherein converting the at least one HMI file into an image file comprises converting the at least one HMI file into at least one of a bitmap image file and a jpeg image file.

12. A network-based system for facilitating transfer of Human Machine Interface (HMI) files, said network-based system comprising:
   at least one server comprising a memory; and
   at least one client system connected to said server through a network, said server configured to:
      upload at least one HMI file via said network to said server;
      convert the at least one HMI file into an image file; and
      delete the at least one HMI file from said server when a pre-determined period of time specified for a download of the at least one HMI file from said server to said at least one client system has lapsed.

13. A network-based system in accordance with claim 12 wherein said server further configured to upload at least one HMI file comprising at least one of a HMI screen and a HMI object.

14. A network-based system in accordance with claim 12 wherein said server further configured to open the at least one HMI file when uploading is complete.

15. A network-based system in accordance with claim 14 wherein server further configured to issue a print screen command to save the screen of the open HMI file into said memory.

16. A network-based system in accordance with claim 15 wherein said server further configured to close the at least one HMI file after issuing the print screen command.

17. A network-based system in accordance with claim 15 wherein said server further configured to open a paint brush application.

18. A network-based system in accordance with claim 17 wherein said server further configured to:
   paste the saved screen of the HMI file into the paint brush application; and
   save the paint brush application, including the saved screen of the HMI file, as an image file.

19. A network-based system in accordance with claim 18 wherein said server further configured to save the paint brush application, including the saved screen of the HMI file, to said server.

20. A network-based system in accordance with claim 18 wherein said server further configured to save the paint brush application, including the saved screen of the HMI file, as a jpeg image file.

21. A network-based system in accordance with claim 18 wherein said server further configured to save the paint brush application, including the saved screen of the HMI file, as a bitmap image file.

22. A network-based system in accordance with claim 12 wherein said server further configured to convert the at least one HMI file into at least one of a bitmap image file and a jpeg image file.

* * * * *